(12) United States Patent
Luo et al.

(10) Patent No.: US 8,791,680 B2
(45) Date of Patent: Jul. 29, 2014

(54) VOLTAGE REGULATOR WITH OPTIMAL EFFICIENCY SELECTION AND A MASTER-SLAVE ZERO CROSS DETECTION CONFIGURATION

(71) Applicant: Dell Products, LP, Round Rock, TX (US)

(72) Inventors: Shiguo Luo, Austin, TX (US); Colin Lambert, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 13/716,823

(22) Filed: Dec. 17, 2012

(65) Prior Publication Data
US 2013/0099766 A1  Apr. 25, 2013

Related U.S. Application Data

(63) Continuation of application No. 12/759,961, filed on Apr. 14, 2010, now Pat. No. 8,358,115.

(51) Int. Cl.
*G05F 1/00* (2006.01)

(52) U.S. Cl.
USPC .......................................... 323/285; 323/282

(58) Field of Classification Search
USPC .................. 323/222, 271, 282, 283, 284, 285
See application file for complete search history.

(56) References Cited

U.S. PATENT DOCUMENTS

| | | | |
|---|---|---|---|
| 7,034,511 B2 | 4/2006 | Schuellein et al. | |
| 2003/0102850 A1 | 6/2003 | Susak et al. | |
| 2008/0303495 A1* | 12/2008 | Wei et al. | 323/272 |
| 2009/0224731 A1 | 9/2009 | Tang et al. | |
| 2009/0256535 A1 | 10/2009 | Houston et al. | |
| 2009/0295353 A1 | 12/2009 | De Lima Filho et al. | |
| 2009/0322292 A1 | 12/2009 | Augustyniak | |
| 2010/0244799 A1 | 9/2010 | Moussaoui | |
| 2011/0254526 A1 | 10/2011 | Luo et al. | |

* cited by examiner

*Primary Examiner* — Nguyen Tran
(74) *Attorney, Agent, or Firm* — Larson Newman, LLP

(57) ABSTRACT

A voltage regulator includes a first phase power stage, a second phase power stage, and a controller. The first phase power stage includes a zero cross detection circuit configured to measure a current level for the first phase power stage, and to cause a diode emulation state in the first phase power stage when the current level is substantially equal to zero. The second phase power stage is in communication with the zero cross detection circuit, and configured to enter the diode emulation state in response to receiving a signal from the zero cross detection circuit. The controller is coupled to the first phase power stage and to the second phase power stage. The controller is configured to measure an output current of the voltage regulator and to activate the second phase power stage when the output current is above a first threshold current level.

20 Claims, 6 Drawing Sheets

VOLTAGE REGULATOR WITH OPTIMAL EFFICIENCY SELECTION AND A MASTER-SLAVE ZERO CROSS DETECTION CONFIGURATION

CROSS REFERENCE TO RELATED APPLICATIONS

This application is a continuation of U.S. patent application Ser. No. 12/759,961, entitled "Voltage Regulator with Optimal Efficiency Selection and a Master-Slave Zero Cross Detection Configuration," filed on Apr. 14, 2010, the disclosure of which is hereby expressly incorporated by reference in its entirety.

FIELD OF THE DISCLOSURE

This disclosure relates generally to information handling systems, and more particularly relates to a voltage regulator with optimal efficiency selection and a master-slave zero cross detection configuration.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a number of direct current to direct current (DC-DC) voltage regulators that provide regulated voltages to different loads. The load current may vary across a broad range from relatively high peak currents to very low stable currents. From power efficiency perspective, voltage regulators may be required to maintain a high efficiency or low power loss over such current ranges. A voltage regulator may include a controller, one or more drivers, and one or more phase power stages. Furthermore, a phase power stage may include on inductor, one or more metal-oxide-semiconductor-field-effect-transistors (MOSFETs) as switches, which may be driven by the MOSFET drivers.

The DC-DC converters used in voltage regulators implemented in servers typically should be designed for a large range of server configurations. The DC-DC converters in the voltage regulators of these servers generally need to be designed to handle the full load of the server safely, and also need to be optimized for efficiency, size, and cost. Additionally, in multi-phase voltage regulators that use a diode as an inductor freewheeling switch, the load can drop such that the voltage regulator enters a discontinuous current mode (DCM), which is caused when the instantaneous current in an inductor of the voltage regulator drops below zero amperes. The voltage regulator may enter to negative current operating mode if a MOSFET is used as a synchronous switch for inductor freewheeling, because a MOSFET has bi-directional current conduction capability. The negative current can cause additional power loss by a reverse current flowing through the inductor and a low-side MOSFET. A technique known as diode emulation can be implemented to reduce these losses in the low-side MOSFET and the inductor. Diode emulation is performed when the low-side MOSFET is turned off as the current reaches zero, and the current is prevented from circulating in the DC-DC converter.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
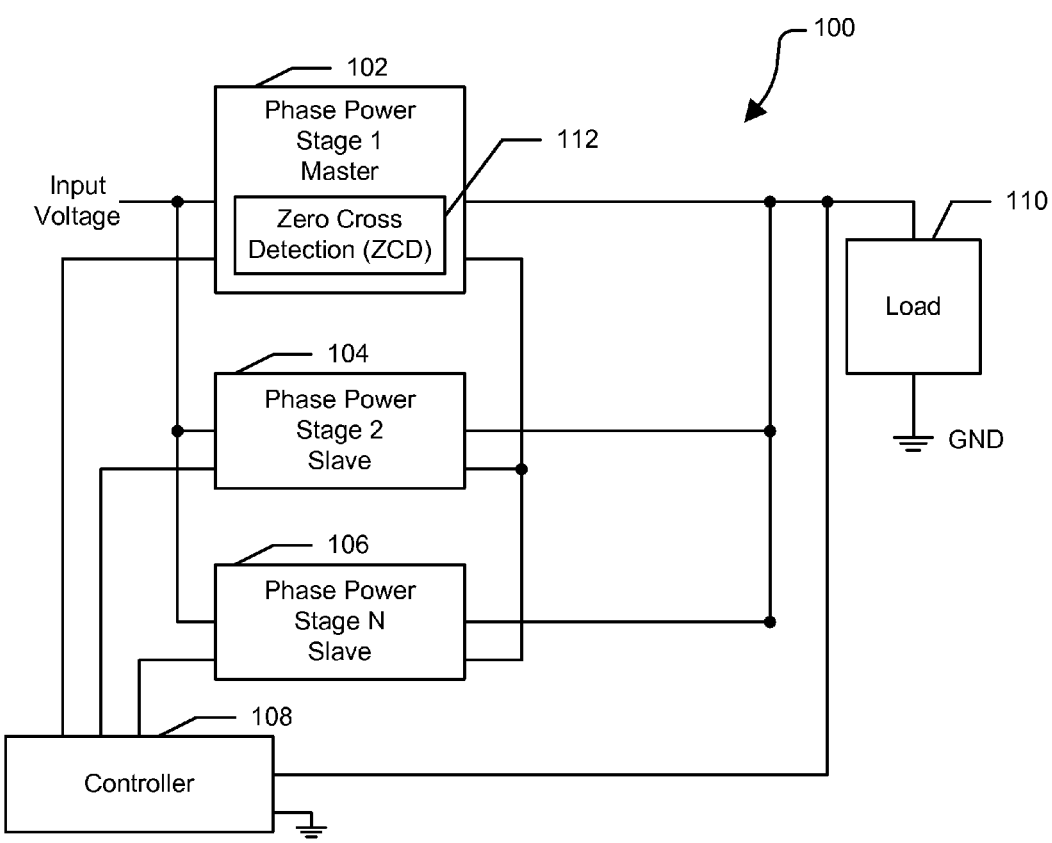
FIG. 1 is a block diagram of a voltage regulator.

FIG. 1 shows a voltage regulator 100 of an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The voltage regulator 100 includes a first phase power stage 102, a second phase power stage 104, an nth phase power stage 106, a controller 108, and a load 110. The first phase power stage 102 includes a first terminal, a second terminal connected to an input voltage, and third terminal and fourth terminals. The second phase power stage 104 includes a first terminal, a second terminal connected to the input voltage and to the second terminal of the first phase power stage 102, a third terminal connected to the third terminal of the first phase power stage, and a fourth terminal connected to the fourth terminal of the first phase power stage. The nth phase power stage 106 includes a first terminal, a second terminal connected to the input voltage and to the second terminal of the first phase power stage 102, a third terminal connected to the third terminal of the first phase power stage, and a fourth terminal connected to the fourth terminal of the first phase power stage. The controller 108 includes a first terminal connected to the first terminal of the first phase power stage 102, a second terminal connected to the first terminal of the second phase power stage 104, a third terminal connected to the first terminal of the nth phase power stage 106, a fourth terminal, and a fifth input terminal connected to a voltage reference, labeled GND. The load 110 has a first terminal connected to the fourth terminal of the controller 108 and to the third terminals of the phase power stages 102, 104, and 106, and a second terminal connect to the reference voltage.

Each of the first phase power stage 102, the second phase power stage 104, and the nth phase power stage 106 that are enabled preferably contribute the same amount of current to the load 110. For example, if the load 110 receives 20 Amperes and only the first phase power stage 102 and the second phase power stage 104 are enabled, each phase power stage can preferably contribute 10 Amperes to the load. The controller 108 is configured to measure the current provided to the load 110, and to enable or disable one or more of the phase power stages based on the current applied to the load. For example, as the current applied to the load 110 increases, the controller 108 can enable one or more phase power stages. Similarly, as the current applied to the load 110 decreases, the controller 108 can disable one or more phase power stages.

The first phase power stage 102 preferably includes a zero cross detection circuit 112 that is configured to measure the current in the first phase power stage. The current in the first phase power stage 102 can be measured in a low-side MOSFET of the first phase power stage, across an inductor, or the like. Each of the phase power stages 102, 104, and 106 preferably include a high-side MOSFET, a low side MOSFET, and an inductor as discussed in greater detail with respect to FIG. 2. The zero cross detection circuit 112 also is configured to detect when the current in the first phase power stage approaches and/or crosses zero. When the current in the first phase power stage crosses zero, the zero cross detection circuit 112 preferably disables the low-side MOSFET of the first phase power stage 102 along with the low-side MOSFET of any additional phase power stage currently enabled by the controller 108.

The disabling of the low-side MOSFET provides diode emulation in the first phase power stage 102, the second phase power stage 104, and the nth phase power stage 106. The diode emulation is created when the low-side MOSFET is disabled such that the current cannot flow through the low-side MOSFET or the inductor of the phase power stage. Thus, the diode emulation preferably prevents the current in the first phase power stage 102 from flowing in the opposite direction of the desired flow.

The first phase power stage 102, the second phase power stage 104, and the nth phase power stage 106 are preferably similarly designed and implemented so that the current through each phase power stage crosses zero at substantially the same time. Thus, the zero cross detection circuit 112 in the first phase power stage 102 can control the diode emulation of each of the phase power stages based on the detection of the current in the first phase power stage crossing zero.

Figure 2:
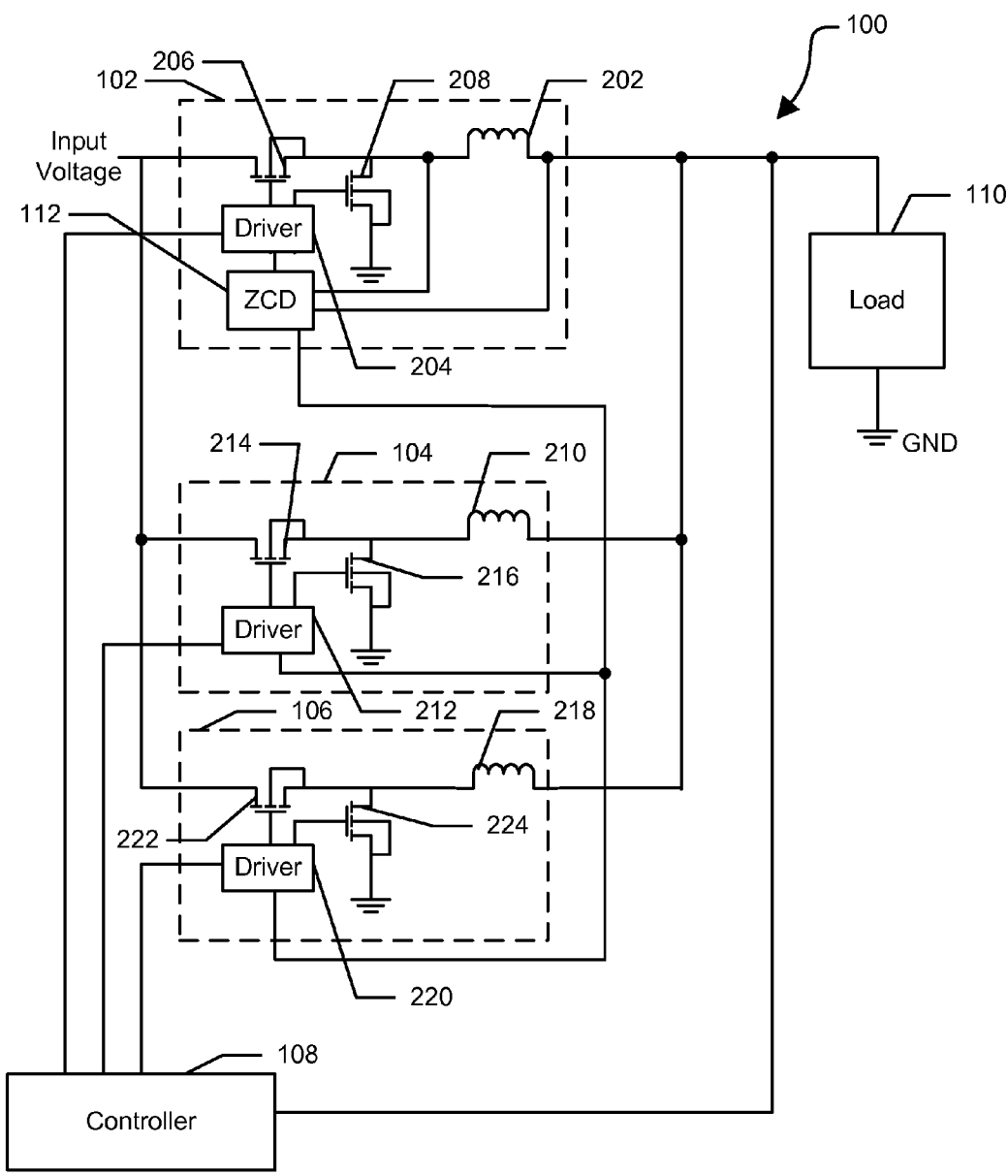
FIG. 2 is a partial block diagram and a partial schematic diagram of the voltage regulator.

FIG. 2 shows a partial schematic and partial block diagram of the voltage regulator 100 including the first phase power stage 102, the second phase power stage 104, the nth phase power stage 106, the controller 108, and the load 110. The first phase power stage 102, the second phase power stage 104, the nth phase power stage 106, the controller 108, and the load 110 are preferably connected in substantially the same manner as described above with respect to FIG. 1.

The first phase power stage 102 includes an inductor 202, a driver 204, a high-side MOSFET 206, a low-side MOSFET 208, and the zero cross detection circuit 112. The zero cross detection circuit 112 includes first, second, third, and fourth terminals. The inductor 202 includes a first terminal connected to the second terminal of the zero current detection circuit 112, and a second terminal connected to the third terminal of the zero current detection circuit. The driver 204 includes a first input terminal connected to the first terminal of the controller 108, second and third terminals, and a fourth terminal connected to the second terminal of the zero cross detection circuit 112. The high-side MOSFET 206 includes a first current electrode connected to the input voltage, a second current electrode connected to the first terminal of the inductor 202, and a control electrode connected to the second terminal of the driver 204. The low-side MOSFET 208 includes a first current electrode connected to the third terminal of the zero cross detection circuit 112, a second current electrode connected to the voltage reference, and a control electrode connected to the third terminal of the driver 204.

The second phase power stage 104 includes an inductor 210, a driver 212, a high-side MOSFET 214, and a low-side MOSFET 218. The inductor 210 includes a first terminal, and a second terminal connected the second terminal of the inductor 202. The driver 212 includes a first terminal connected to the second terminal of the controller 108, second and third terminals, and a fourth terminal connected to the fourth terminal of the zero cross detection circuit 112. The high-side MOSFET 214 includes a first current electrode connected to the input voltage, a second current electrode connected to the first terminal of the inductor 210, and a control electrode connected to the second terminal of the driver 212. The low-side MOSFET 218 includes a first current electrode connected to the second current electrode of the MOSFET 214, a second current electrode connected to the voltage reference, and a control electrode connected to the third terminal of the driver 212.

The nth phase power stage 106 includes an inductor 218, a driver 220, a high-side MOSFET 222, and a low-side MOSFET 224. The inductor 210 includes a first terminal, and a second terminal connected the second terminal of the inductor 202. The driver 220 includes a first terminal connected to the third terminal of the controller 108, second and third terminals, and a fourth terminal connected to the fourth terminal of the zero cross detection circuit 112. The high-side MOSFET 222 includes a first current electrode connected to the input voltage, a second current electrode connected to the first terminal of the inductor 218, and a control electrode connected to the second terminal of the driver 220. The low-side MOSFET 224 includes a first current electrode connected to the second current electrode of the MOSFET 222, a second current electrode connected to the voltage reference, and a control electrode connected to the third terminal of the driver 220.

The driver 204 preferably controls the activation and deactivation of the high-side MOSFET 206 and the low-side MOSFET 208 to regulate the current provide from the first phase power stage 102 to the load 110. The driver 212 preferably controls the activation and deactivation of the high-side MOSFET 214 and the low-side MOSFET 218 to regulate the current provide from the second phase power stage 104 to the load 110. The driver 220 preferably controls the activation and deactivation of the high-side MOSFET 222 and the low-side MOSFET 224 to regulate the current provided from the nth phase power stage 106 to the load 110.

The zero cross detection circuit 112 preferably monitors the current flowing through the first phase power stage 102 to determine whether the current is approaching zero. When the current is above zero, the zero cross detection circuit 112 can cause the phase power stages 102, 104, and 106 to operate in a non-diode emulation or a continuous current mode. However, when the zero cross detection circuit 112 detects that the current is zero, the zero cross detection circuit can set a flag in the drivers 204, 212, and 220, send a signal to the drivers, or the like to cause the drivers to deactivate the low-side MOSFETs 208, 218, and 224. The deactivation of the low-side MOSFETs 208, 218, and 224 causes the current to stop flowing through each of the phase power stages 102, 104, and 106. Thus, the first phase power stage 102, the second phase power stage 104, and the nth phase power stage 106 are prevented from entering into a discontinuous current mode (DCM), which in turn reduces energy losses in the voltage regulator 100. The efficiency of the voltage regulator 100 can be increase by causing each of the phase power stages 102, 104, and 106 to operate in the diode emulation mode.

The controller 108 is configured to implement phase shedding based on the amount of current applied to the load 110. Phase shedding occurs when the controller 108 enables or disables one or more of the phase power stages 102, 104, and 106 in response to the current applied to the load 110. For example, as the current applied to the load 110 increases, the controller 108 can enable one or more phase power stages. Similarly, as the current applied to the load 110 decreases, the controller 108 can disable one or more phase power stages. The phase shedding enables the voltage regulator 100 to operate with fewer phase power stages active while the voltage regulator is in a continuous current mode. The controller 108 can calculate the efficiency of the voltage regulator 100 while the active phase power stages are operating in both the diode emulation mode and the non-diode emulation mode. The controller 108 can compare the efficiencies of the different operating mode, and can utilize this information in implementing the phase shedding.

Figure 3:
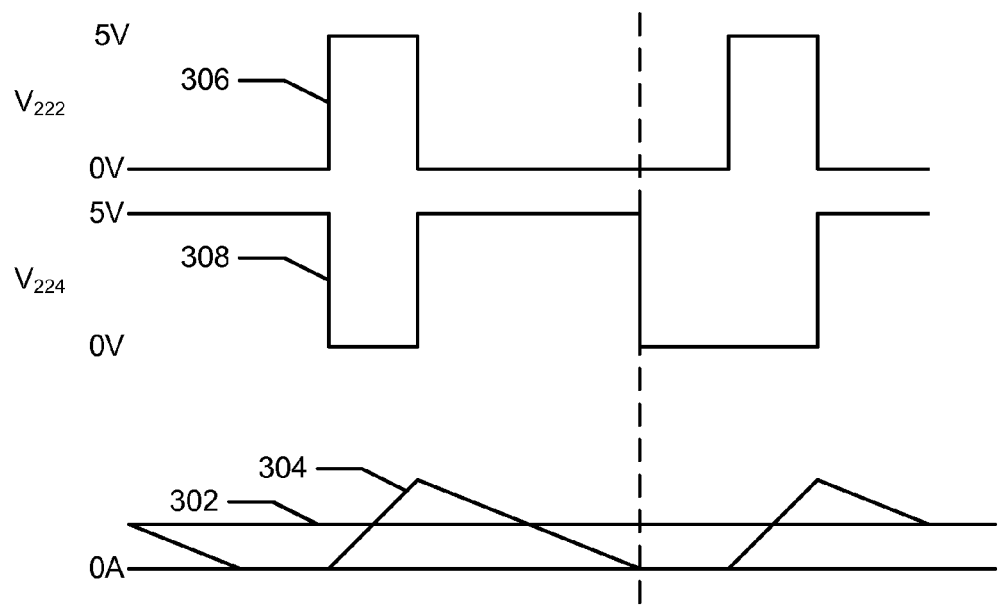
FIG. 3 is a timing diagram of various waveforms associated with the voltage regulator.

FIG. 3 shows a plurality of wave forms associated with the voltage regulator 100 including a DC output current 302 which represents an averaging current of an instantaneous inductor current 304, a drive voltage 306 for the high-side MOSFET 206, and a drive voltage 308 for the low-side MOSFET 208. The inductor current 304 preferably varies based on the activation and deactivation of the high-side MOSFET 206 and the low-side MOSFET 208. The inductor current 304 increases when the drive voltage 306 transitions to a high voltage level and the drive voltage 308 transitions to a low voltage level. Both drive voltages 306 and 308 are logically reverse each other, such that the drive voltage 308 should be at low-level when 306 is at high voltage level. When the drive voltage 306 is at the high voltage level, the high-side MOSFET 206 is activated such that current is provided from the input of the voltage regulator 100 to the load 110 thru the inductor 202. However, when the drive voltage 306 is at a low voltage level, the high-side MOSFET 206 is deactivated and the current is no longer provided from the input to load 110 through the inductor 202. When the drive voltage 308 is at the low voltage level, the low-side MOSFET 208 is deactivated such that the current is prevented from flowing through the low-side MOSFET. When both drive voltages are at low level, inductor current can be freewheeling thru a body diode of low-side MOSFET 208 and the load 110. However, when the drive voltage 308 is at the high voltage level, the low-side MOSFET 208 is activated such that the inductor current 304 can flow through the low-side MOSFET and a lower voltage drop across the MOSFET and the inductor current 304 can be provided to the load 110.

When the zero cross detection circuit 112 detects that the inductor current 304 reaches zero, the zero cross detection circuit can transmit a signal to the driver 204 that causes the driver to transition the drive voltage 308 to a low voltage level. The low voltage level of the drive voltage 308 preferably deactivates the low-side MOSFET 208 so the inductor current cannot flow through the low-side MOSFET reversely. During this period, the drive voltage 306 is also preferably at the low voltage level, such that the high-side MOSFET 206 is deactivated. Thus, the inductor current 304 cannot flow through the first phase power stage 102, the zero cross detection circuit can also communicate a zero current detection signal to the drivers 212 and 220 of the respective phase power stages 104 and 106. The driver 212 can send similar drive control voltages to the driver 212 of the second phase power stage 104 and the driver 220 of the nth phase power stage 106, such that the second and nth phase power stages can operate similarly as the first phase power stage 102, and can preferably provide substantially the same amount of current to the load 110 as the first phase power stage. In order to obtain phase current and voltage ripple cancellation, each phase driver control voltage preferably has its own timing and can operate in an interleaved mode. A phase shift between phase power stages preferably equals 1/n of 360 degrees, or 1/n of switching period, wherein n is the phase power stage number such as 1, 2, 3, or the like.

Figure 4:
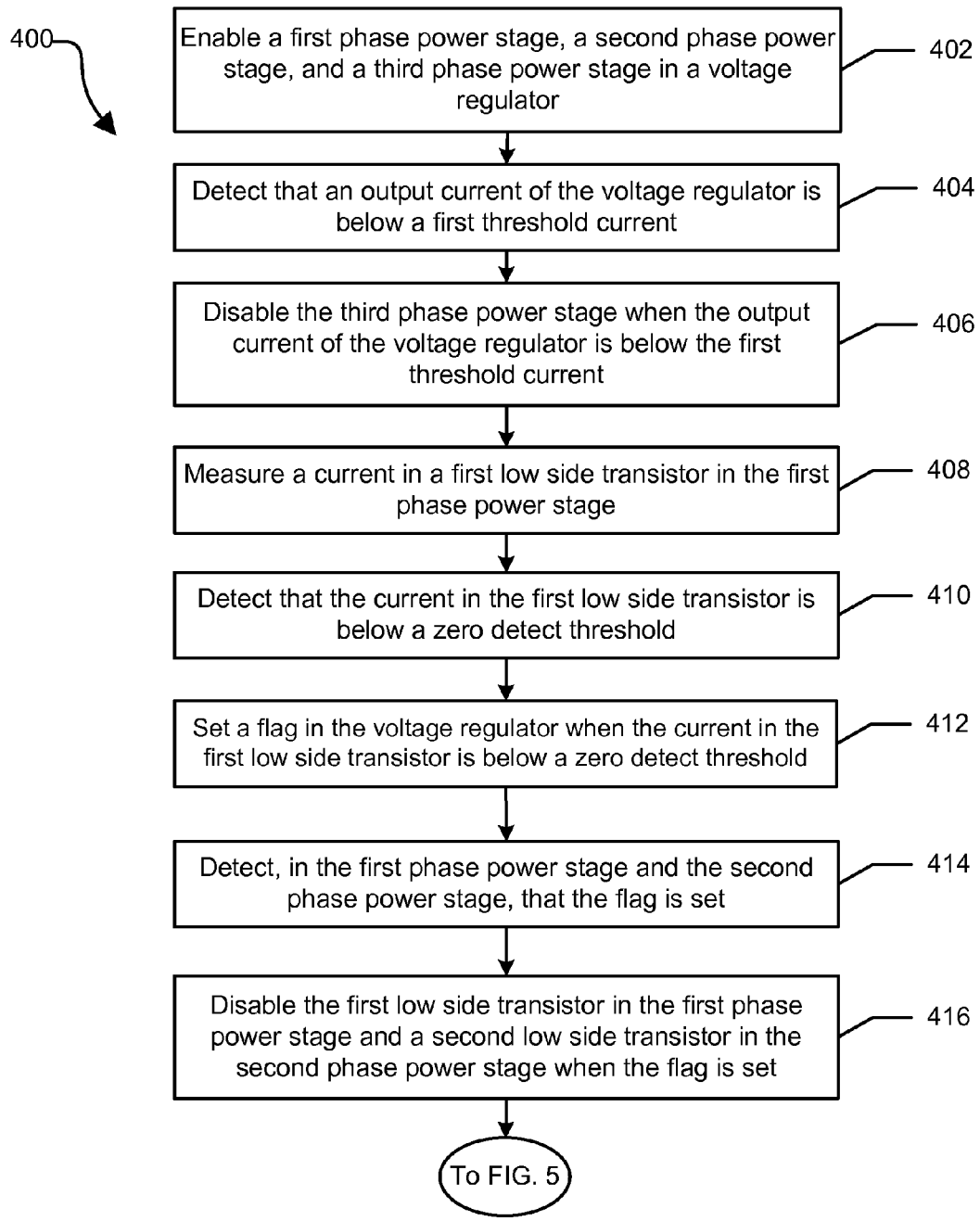
FIGS. 4 and 5 are a flow diagram of a method for managing the voltage regulator.
Figure 5:
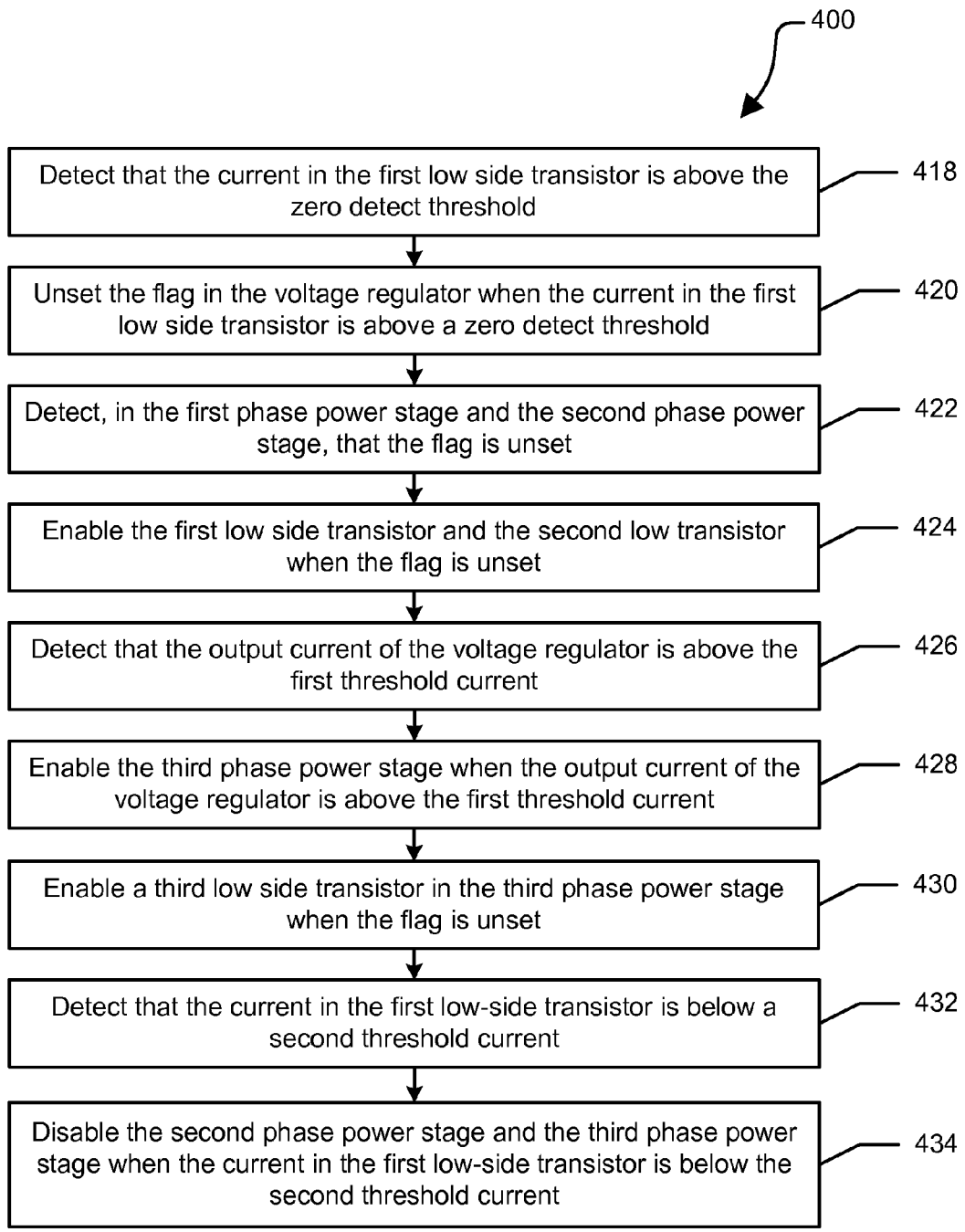

FIGS. 4 and 5 show a flow diagram of a method 400 for managing the voltage regulator 100. For a n+1 redundant voltage regulator, such that a two phase voltage regulator is the basic design, the +1 phase is a redundant phase for reliability purposes. At block 402, a first phase power stage, a second phase power stage, and a third phase power stage are enabled in the voltage regulator. A determination is made that an output current of the voltage regulator is below a first threshold current, at block 404. At block 406, the third phase power stage is disabled when the output current of the voltage regulator is below the first threshold current. A current measured in a first low side MOSFET in the first phase power stage at block 408. At block 410, a determination that the current in the first low side MOSFET is below a zero detect threshold. A flag is set in the voltage regulator when the current in the first low side MOSFET is below a zero detect threshold at block 412. At block 414, a determination is made in the first phase power stage and the second phase power stage that the flag is set. The first low side MOSFET in the first phase power stage and a second low side MOSFET in the second phase power stage are disabled when the flag is set at block 416.

At block 418, the current is detected in the first low side MOSFET as being above the zero detect threshold. The flag is unset in the voltage regulator when the current in the first low side MOSFET is above a zero detect threshold at block 420. At block 422, the first phase power stage and the second phase power stage detect that the flag is unset. The first low side MOSFET and the second low MOSFET are enabled when the flag is unset at block 424. At block 426, a determination is made that the output current of the voltage regulator is above the first threshold current. The third phase power stage is enabled when the output current of the voltage regulator is above the first threshold current at block 428. At block 430, a third low side MOSFET is enabled in the third phase power stage when the flag is unset. A determination is made that the current in the first low-side MOSFET is below a second threshold current at block 432. At block 434, the second phase power stage and the third phase power stage are disabled when the current in the first low-side MOSFET is below the second threshold current.

Figure 6:
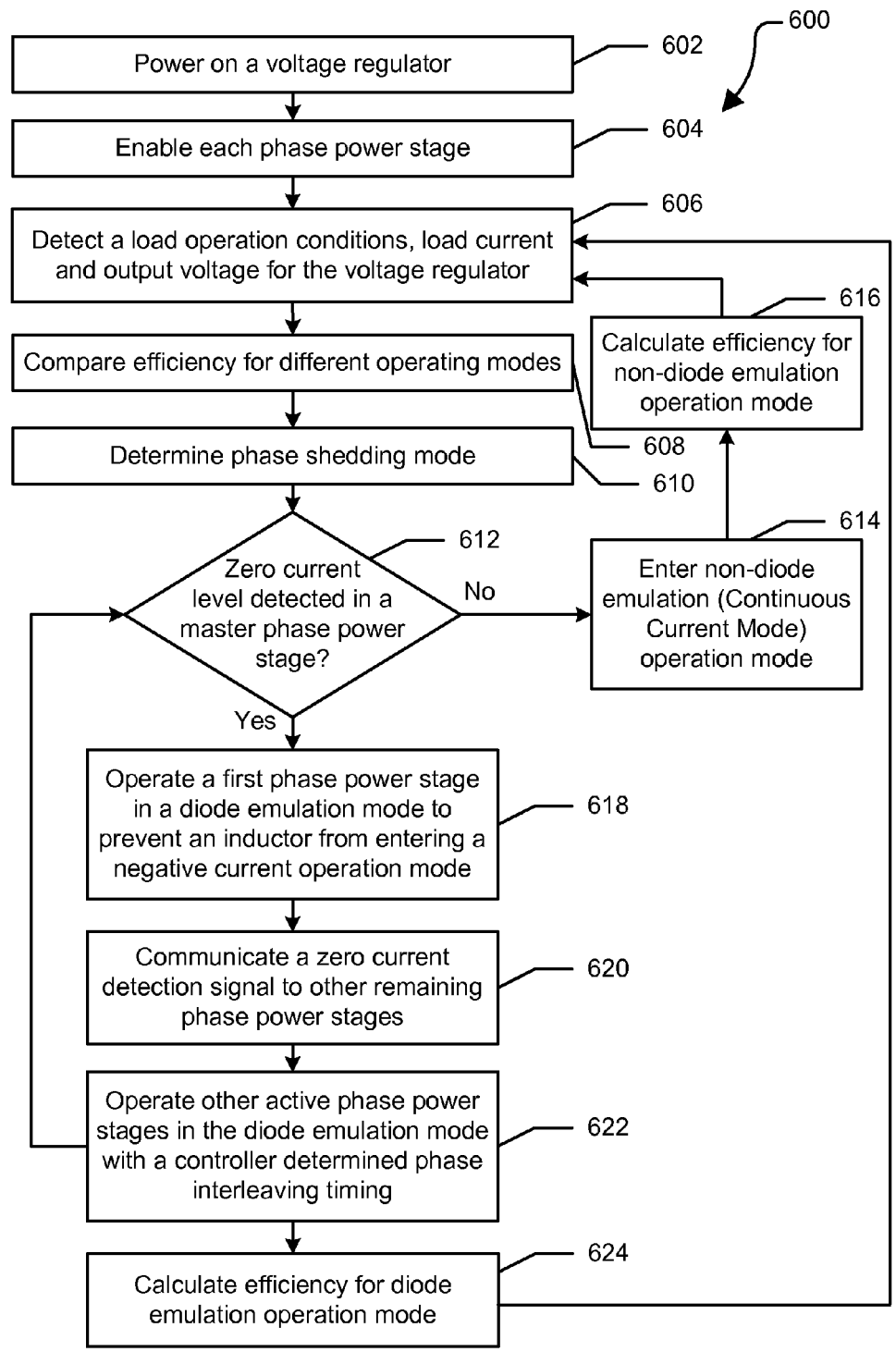
FIG. 6 is a flow diagram of a method for implementing a master-slave diode emulation mode configuration of the voltage regulator.

FIG. 6 shows a flow diagram of a method 600 for implementing a master-slave diode emulation mode configuration of the voltage regulator. At block 602, a voltage regulator is powered on. Each of the phase power stages in the voltage regulator are enabled at block 604. At block 606, a load operation conditions, such as a load current and output voltage, are detected. At block 608, an efficiency number for the voltage regulator is compared for the different operation modes. A phase shedding mode is determined at block 610. The phase shedding mode can determine the number of phase power stages that are enabled in the voltage regulator.

At block 612, a determination is made whether a zero current level is detected in a master phase power stage. The zero cross detection circuit of the master phase power stage can preferably detect whether the zero current has occurred. If the zero current level is not detected, the voltage regulator enters a non-diode emulation or a continuous current mode operation mode at block 614. At block 616, an efficiency of the voltage regulator is calculated for the non-diode emulation operation mode, and the flow diagram continues as stated above at block 606. If the zero current level is detected, a first phase power stage is operated in a diode emulation mode to prevent an inductor from entering a negative current operation mode at block 618. At block 620, a zero current detection signal is communicated to the other remaining phase power stages of the voltage regulator. At block 622, the other active phase power stages are operated in the diode emulation mode with a controller determined phase interleaving timing. At substantially the same time the flow diagram continues as stated above at block 612 and also proceeds to block 624. At block 624, the efficiency of the voltage regulator is calculated for the diode emulation operation mode, and the flow diagram continues as stated above at block 606.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A voltage regulator comprising:
   a first phase power stage connected in parallel with a second phase power stage, the first phase power stage including:
   a first high side transistor configured to activate and deactivate to regulate an input voltage; and
   a first low side transistor coupled to the first high side transistor, the first low side transistor configured to deactivate in response to a signal from a zero cross detection circuit of the second phase power stage, wherein the signal indicates that a current level in the second phase power stage is substantially equal to zero;
   wherein the first phase power stage is configured to be activated in response to an output current being above a first threshold current level.

2. The voltage regulator of claim 1 further comprising:
   a third phase power stage including:
   a second high side transistor configured to activate and deactivate to regulate the input voltage; and
   a second low side transistor coupled to the second high side transistor, the second low side transistor configured to deactivate in response to the signal from the zero cross detection circuit.

3. The voltage regulator of claim 2 further comprising:
   a controller coupled to the first phase power stage, the controller configured to measure the output current of the voltage regulator and to activate the first phase power stage in response the output current being above the first threshold current level.

4. The voltage regulator of claim 3 wherein the controller is further configured to enable the third phase power stage in response to the output current being above a second threshold current level.

5. The voltage regulator of claim 1 wherein the first phase power stage further includes:
   a drive circuit coupled to the first high side transistor and to the first low high side transistor, the drive circuit configured to control the first high side transistor and the first low side transistor based on the signal from the zero cross detection circuit.

6. The voltage regulator of claim 1 wherein the current level is measured in a low side transistor of the second phase power stage.

7. The voltage regulator of claim 1 wherein the current level is measured based on a current through an inductor.

8. A voltage regulator comprising:
   a first phase power stage in communication with a zero cross detection circuit of a second phase power stage, the first phase power stage configured to enter a diode emulation state in response to a signal from the zero cross detection circuit, wherein the signal indicates that a current level in the second phase power stage is substantially equal to zero;
   wherein the first phase power stage is configured to be activated in response to an output current being above a first threshold current level.

9. The voltage regulator of claim 8 further comprising:
   a third phase power stage in communication with the zero cross detection circuit, the third phase power stage configured to enter the diode emulation state in response to receiving the signal from the zero cross detection circuit.

10. The voltage regulator of claim 9 further comprising:
    a controller coupled to the first phase power stage, the controller configured to measure the output current of the voltage regulator and to activate the first phase power stage in response to the output current being above the first threshold current level.

11. The voltage regulator of claim 10 wherein the controller is further configured to enable the third phase power stage in response to the output current being above a second threshold current level.

12. The voltage regulator of claim 8 wherein the current level is measured in a low side transistor of the second phase power stage.

13. The voltage regulator of claim 8 wherein the current level is measure based on a current through an inductor.

14. A method comprising:
enabling a first phase power stage in a voltage regulator;
detecting that a current in a second phase power stage is below a zero detect threshold;
setting a flag in the voltage regulator in response to the current being below the zero detect threshold;
detecting, in the first phase power stage, that the flag is set; and
disabling a low side transistor in the first phase power stage when the flag is set.

15. The method of claim 14 further comprising:
detecting that the current is above the zero detect threshold;
unsetting the flag in the voltage regulator in response to the current being above the zero detect threshold;
detecting, in the first phase power stage, that the flag is unset;
enabling the low side transistor when the flag is unset.

16. The method of claim 15 further comprising:
detecting that an output current of the voltage regulator is below a first threshold current; and
disabling a third phase power stage in response to the output current of the voltage regulator being below the first threshold current.

17. The method of claim 16 further comprising:
detecting that the output current of the voltage regulator is above the first threshold current;
enabling the third phase power stage in response to the output current of the voltage regulator being above the first threshold current; and
enabling a low side transistor in the third phase power stage when the flag is unset.

18. The method of claim 16 further comprising:
detecting that the current in the second phase power stage is below a second threshold current; and
disabling the first phase power in response to the current in the second phase power stage being below the second threshold current.

19. The method of claim 18 wherein the second threshold current is less than the first threshold current.

20. The method of claim 14 wherein the current level is measure based on a current through an inductor.

* * * * *